Aug. 14, 1962   W. NEUERBURG ETAL   3,049,171
FUEL TANK CONSTRUCTION
Filed April 14, 1959
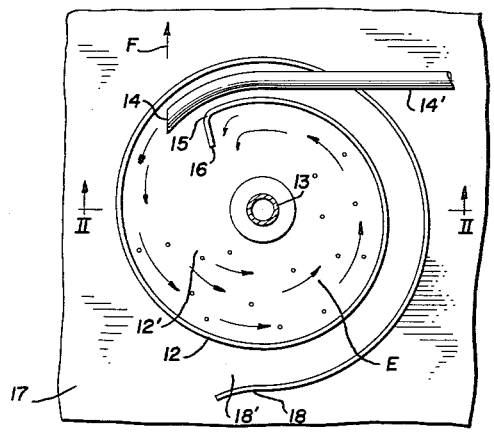
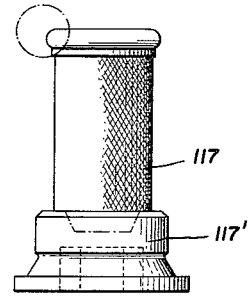
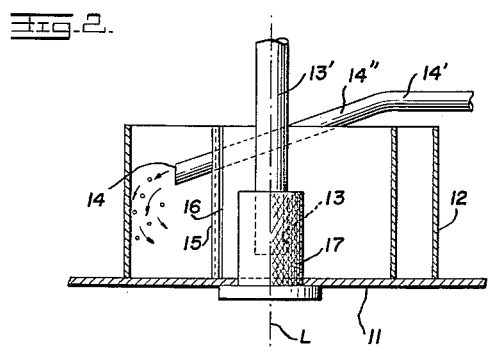
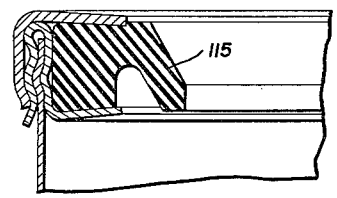
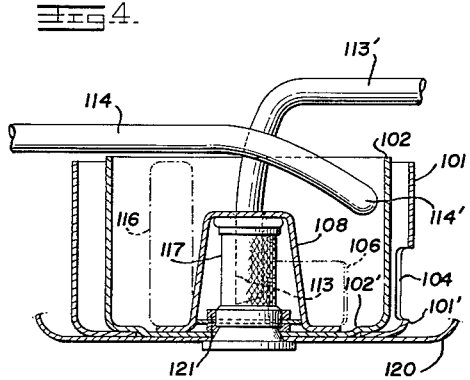
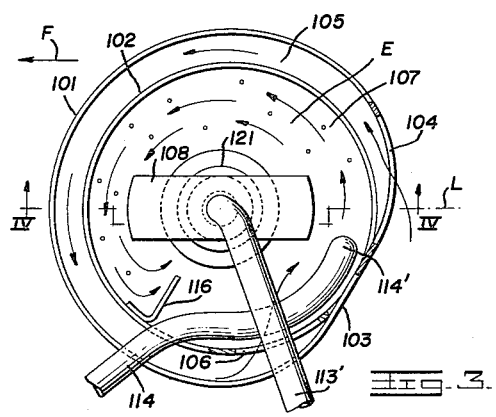
INVENTORS
WILLI NEUERBURG
ARTHUR MAEHLER
HORST FIEDLER
BY Dicke, Craig and Freudenberg
ATTORNEYS

United States Patent Office 3,049,171
Patented Aug. 14, 1962

3,049,171
FUEL TANK CONSTRUCTION
Willi Neuerburg, Stuttgart-Unterturkheim, Arthur Maehler, Fellbach, near Stuttgart, and Horst Fiedler, Stuttgart-Bad Cannstatt, Germany, assignors to Daimler-Benz Aktiengesellschaft, Stuttgart-Unterturkheim, Germany
Filed Apr. 14, 1959, Ser. No. 806,347
Claims priority, application Germany Apr. 18, 1958
22 Claims. (Cl. 158—46)

The present invention relates to an arrangement provided in the fuel tank for internal combustion engines, especially of motor vehicles, for purposes of damming up, scooping or collecting a quantity of fuel sufficient for the supply of the internal combustion engine during the occurrence of accelerating forces acting on the vehicle in the form of a collecting or storing housing arranged about the intake or suction conduit of the fuel supply line and terminating with the fuel tank bottom.

It is known in the prior art to provide installations in the fuel tank for internal combustion engines, especially of motor vehicles, which serve for purposes of damming up, storing up or collecting, especially with a relatively low fuel level or under low fuel conditions in the tank, during braking and accelerating as well as during curve drives, a quantity of fuel within the region of the fuel outlet or discharge line which is sufficient for the supply of the internal combustion engine. Such installations are used in practice, for example, in the form of relatively low partition walls extending in the transverse direction of the fuel tank and secured to the tank bottom ahead and/or behind the discharge line whereby, during the occurrence of accelerating forces in the direction of the drive of in the opposite direction with respect thereto the fuel level attempting to flow off is dammed up or collected by these partition walls.

Furthermore, it is known in the prior art to arrange above the outlet or discharge in the fuel tank at the tank bottom an S-shaped, curved vertically extending guide sheet metal strip along the outer leg portions of which the fuel running to and fro is dammed up and is thereby to be conducted to the fuel outlet or discharge.

Furthermore, fuel tanks are known in the prior art the inner space of which is subdivided in a box-shaped manner by sheet metal walls whereby an outlet or discharge is provided in each individual space. Additionally, fuel reservoirs or tanks are known in the prior art in which a box-shaped subdivision is realized by means of anti-rolling or baffle plates provided with many small apertures.

It has also been proposed already in the prior art to arrange about the intake connecting member of the fuel supply line an anti-rolling or baffle box with four side walls rigidly connected with the fuel bottom which is provided with apertures in proximity to the fuel bottom for the flow of the fuel.

The installations mentioned hereinabove and known in the prior art, however, exhibit for the most part considerable shortcomings and disadvantages. No definite safeguard is provided by the use of damming-up walls and guide walls arranged only transversely to the driving direction that with all possibly occurring driving conditions, in fact, a sufficient fuel supply for the internal combustion engine is assured. If it is considered, for example, that under normal driving conditions considerably more accelerating forces occur in the transverse direction with respect to the vehicle in the form of centrifugal forces by reason of driving through curves than accelerating forces in the driving directions and in the direction opposite to the driving direction, then with the known prior art installations very often, namely, with the occurrence of centrifugal forces, no damming up or collecting takes place of the fuel otherwise flowing off under the influence of such forces in the transverse direction to the vehicle whereby a safe and reliable fuel supply is still doubtful or questionable as before.

With the known fuel tanks provided with a box-shaped subdivided inner space in which the individual baffle plates are provided with small communicating passages or apertures, the fuel, particularly while passing through a relatively long curve, flows out of the intermediate region or area of the inlet member or connecting piece of the fuel section line whereby the fuel supply to the engine is interrupted and air may enter into the fuel intake or suction line. The same disadvantages also occur under the same circumstances with an arrangement of an anti-rolling baffle box arranged about the fuel inlet member and provided with universally arranged passages or apertures.

Finally, it should also be noted that a separate discharge line for each individual sub-space of the fuel tank involves a high constructional expenditure which causes considerable costs and expenses.

In order to avoid the disadvantages encountered in the installations of the prior art mentioned hereinabove, the present invention proposes to construct the outer wall of the damming-up or collecting housing in a closed manner with the exception of a lateral inlet aperture to which adjoins a substantially annular channel or passage delimited by the housing walls which discharges or terminates in the inner space of the housing.

The damming-up or storing housing in accordance with the present invention is constructed in a spiral-shaped manner. The spiral of the housing wall appropriately has at least one and one-half turns, and the substantially annular channel is formed by the passage formed by the wall as it moves in a spiral manner.

According to a further feature of practical significance in accordance with the present invention the collecting or storing housing is constructed of two pot-shaped individual housings closed in themselves and of different size, namely of an outer housing and an inner housing which are arranged either eccentrically one within the other in such a manner that they come in contact with each other only at one place in a direction perpendicular to the circumference thereof and are connected thereat, or are arranged concentrically one within the other whereby the outer housing is flattened off more strongly at the point of common contact than the inner housing and the remaining mutually adjacent walls thereof form an essentially annular channel or passage over the further region of the circumference of the individual housings whereby the fuel inlet aperture which is disposed adjacent the common connecting point is located, preferably in the form of a window, in the wall of the outer housing which extends from the fuel tank bottom approximately up to half the height of the wall thereof. At the end of the annular channel or passage, ahead of the connecting point of the two individual housings, a further aperture is arranged in the wall of the inner individual housing for the fuel entering from the annular passage into the inner space, also preferably in the form a window, which extends from the fuel tank bottom approximately up to half the height of the wall thereof.

A damming up and storing or collecting as well as a retention of the fuel quantity disposed within the housing is effected with certainty and reliability by the use of a construction in accordance with the present invention in every direction since the entire housing stands in the path of the fuel attempting to flow off as a closed housing as viewed from within the inner space of the collecting or storing housing.

Furthermore, by the use of an arrangement in accordance with the present invention, and more particularly by the arrangement of the inlet aperture along the outer circumference of the collecting and storing housing, a filling of the housing inner space is achieved which is aided by the accelerating forces while driving through a curve, either through a right or left curve depending on the fact in which direction or on which side of the housing the inlet aperture is disposed, as well as during braking and stopping.

The present invention is of particular significance and advantage if the same is used in connection with an internal combustion engine of the injection type, especially with a gasoline injection-type engine which utilizes a fuel injection for the gasoline fuel. As is known with gasoline injection systems, even at full load or full throttle, only a fractional part of the supplied fuel quantity is injected into the engine whereas the considerably larger residual quantity of the fuel in the injection pump is discharged, for purposes of cooling thereof, and is conducted back into the fuel tank.

With use of a rotary vane-type pump as fuel supply pump which must be operated to supply a relatively large quantity of fuel in order to operate within the region of a relatively good efficiency thereof, the portion of the returned quantity of fuel as compared to the quantity of fuel used up in the internal combustion engine is particularly high. This condition is determinative for the feature which will be described more fully hereinafter.

In connection therewith and according to another feature of the present invention, it is proposed to locate the discharge of the return duct for the fuel flowing back from the injection pump within the storing or collecting housing. The discharge orifice of the fuel return line is thereby arranged in such a manner that it proceeds or extends tangentially to the inner wall of the storing or collecting housing and is disposed essentially parallel to and in the same direction as the inflowing into fuel flowing the inner space of the housing through the inlet aperture provided in the inner housing wall thereof whereby a rotary movement is produced within the collecting housing by the considerable quantity of the returning fuel which offers a resistance to and opposes thereby differently oriented accelerating forces resulting from the various different driving conditions and thereby effectively prevents any discharge or flow of fuel disposed within the housing again out of the inner space thereof.

In pursuance of the construction proposed hereinabove in accordance with the present invention, a baffle or deflection plate is arranged at the inner wall of the storing or collecting housing extending essentially in the direction toward the intake connecting member of the fuel suction line. The deflection surface is thereby arranged within a region between 270° and 360° after the discharge of the fuel return line from the injection pump so that the returning fuel has sufficient opportunity to be defoamed before it is conducted centripetally by the deflection surface in the direction toward the intake connecting member of the fuel suction line.

Accordingly, it is an object of the present invention to provide a damming-up or collecting and storing arrangement within a fuel tank which obviates the disadvantages of the prior art installations.

It is another object of the present invention to provide a storing or collecting structure within a fuel tank, particularly for internal combustion engines, which assures a sufficient quantity of fuel supply, particularly with a low fuel level in the tank, under all driving conditions and also with the occurrence of any accelerating forces to which the vehicle may be subjected.

Still another object of the present invention is the provision of an storing or collecting device within the fuel tank of an injection type internal combustion engine which effectively prevents the interruption of the supply of fuel and therewith precludes the admission of any air into the fuel suction line with a relatively low level of fuel within the tank.

A further object of the present invention is the provision and construction of a storing device within the fuel tank of an internal combustion engine, especially of motor vehicles, which not only assures a sufficient amount of fuel under all driving conditions with a relatively low level of fuel in the tank but also utilizes the fuel flowing back from the injection pump to increase the efficacy of the device in accordance with the present invention.

These and other objects, features and advantages of the present invention will become more obvious from the following description when taken in connection with the accompanying drawing which shows, for purposes of illustration only, several embodiments in accordance with the present invention, and wherein:

FIGURE 1 is a plan view of a spirally-shaped collecting or storing housing in accordance with the present invention arranged at the fuel tank bottom, FIGURE 2 is a cross sectional view taken along line II—II of FIGURE 1, FIGURE 3 is a plan view of a modified embodiment of a collecting housing in accordance with the present invention arranged at the fuel tank bottom which consists of two individual housings arranged one within the other, FIGURE 4 is a cross sectional view taken along IV—IV of FIGURE 3, FIGURE 5 is an elevational view of a fuel strainer or filter in accordance with the present invention detachably connected with the fuel tank bottom and the bottom of the storing housing, and FIGURE 6 is a partial cross sectional view, on an enlarged scale, of the seal for the intake connecting member of the fuel suction line extending through the upper end of the fuel strainer, and showing, in detail, that portion of the construction thereof encircled in FIGURE 5 in dot and dash line.

Referring now to the drawing wherein like reference numerals are used throughout the various views to designate corresponding parts, and more particularly to FIGURES 1 and 2 thereof, reference numeral 11 designates the bottom of a fuel tank to which is secured, in any suitable manner so as to provide a tight sealing connection, a storing or collecting housing 12 operative to effectively dam-up some of the fuel in the tank when subjected to accelerating forces, which extend about the intake connecting member 13 of the fuel intake suction line 13'. The collector housing 12 is thereby constructed in the form of a spiral which has approximately one and one-half turns.

With internal combustion engines having a fuel injection pump, the return line 14' for the overflowing fuel flowing back from the injection pump discharges within the collector housing 12, preferably within the inner space 12' thereof whereby the discharge orifice 14 of the return line 14' extends tangentially to the inner wall of the housing 12, and more particularly, along the inner wall essentially in the direction toward the inner spiral end 15 disposed within housing 12. As may be clearly visible from FIGURE 2, the end section 14" of the return line 14' is additionally inclined downwardly in the direction to the tank bottom 11. A baffle or deflection plate 16 pointing in the direction toward the intake connecting member 13 of the fuel suction line 13' is arranged at the inner spiral beginning 15, whereby the direction of the deflection surface 16 extends preferably tangentially to the outer circumference of the fuel strainer or filter 17 disposed about the intake connecting member 13. The other outer spiral end 18 is constructed as an essentially funnel-shaped inflow passage 18'.

The beginning of the spiral 15 which is disposed in the forward part of the housing 12 as viewed in the direction of the drive F, is also disposed laterally of the longitudinal center plane L of the spiral extending through the intake connecting member 13 whereas the outer spiral end 18 which is disposed in the rear part of housing 12 as viewed in the direction of the drive F, is disposed approximately on the center longitudinal plane L.

The deflection surface 16 is disposed approximately one complete spiral turn behind the discharge 14 of the fuel return line 14' so that a sufficient defoaming field E is available for the back-flowing fuel to permit all air bubbles to disappear.

The embodiment of the storing housing illustrated in FIGURES 3 and 4 consists of two pot-shaped individual housing of different size, namely of an outer housing 101 and of an inner housing 102 which are concentrically arranged within one another so that they come in contact only in the one place or at one point 103 in a direction essentially perpendicular to the circumference thereof and are connected thereat whereby the outer housing 101 is flattened for that purpose more strongly at one side thereof than the inner housing 102. A window-like aperture 104 is provided in the housing wall 101 adjacent the connecting place 103 in the outer wall 101 of the housing through which the fuel from the tank inner space may flow in the direction toward the inner space of the collecting housing. The communicating passage or aperture 104 is adjoined by an annular channel 105 at the inner end of which is disposed a communicating passage or aperture 106 in the wall of the inner housing 102 through which the fuel is permitted to flow into the inner space of the housing.

The discharge orifice 114 for the fuel return line 114' is disposed within the region of the connecting place 103. A sheet metal deflection or baffle member 116 is secured at the inner side of the wall of the inner housing 102 approximately 270° behind the discharge 114 so that again a sufficiently large defoaming field or area E for the fuel flowing back from the injection pump out of the return line 114' is available from the discharge 114 thereof to deflection baffle 116.

The intake connecting member 113 of the fuel supply or suction line 113' extends essentially along the vertical center axis of the inner housing 102. A bow-shaped bracket member 108 for the intake connecting member 113 which itself extends into a fuel strainer or filter 117, is arranged at the bottom 102' of the inner housing 102 which in turn is rigidly connected with the bottom 101 at the outer housing 101 in any suitable manner. The foot portion 117' (FIGURE 5) of the fuel filter 117 is threadedly inserted from below into a socket 121 (FIGURE 4) rigidly connected with the bottom 120 of the fuel tank. A seal, preferably a lip-shaped seal 115 (FIGURE 6) is provided at the upper end of the fuel filter 117 and, more particularly, at the place where the intake connecting member 113 leaves the filter housing, which seal 115 surrounds the intake connecting member 113. The fuel tank bottom may be provided with a trough-shaped recess within the region of the collector housing 101, 102.

While we have shown and described several embodiments in accordance with the present invention, it is understood that the same is not limited thereto but is susceptible of many changes and modifications within the spirit and scope of the present invention and we, therefore, do not wish to be limited to the particular details shown and described herein but intend to cover all such modifications and changes as are encompassed by the scope of the appended claims.

We claim:

1. A fuel intake arrangement located in the fuel tank for an internal combustion engine of a vehicle supplied with fuel from said fuel tank through a fuel supply line, which arrangement is for damming-up and collecting a quantity of fuel sufficient for the supply of said engine during the occurrence of accelerating forces acting on the vehicle, comprising intake means for leading to said fuel supply line and extending into said fuel tank in proximity to the tank bottom thereof, and housing means attached to said tank bottom and arranged about said intake means including two essentially pot-shaped separate housings of different size, each of said housings having a wall extending upwardly from said tank bottom, the smaller of said two housings being disposed within the larger one to effectively form a communicating passage between the walls thereof in the form of an essentially annular channel, the walls of said two separate housings being connected together at one place, and said channel terminating near one end thereof in the inside of said smaller housing means within the inner space thereat, and the wall of said larger housing means effectively being provided with inlet means in communication with said annular channel and being located laterally near said one place of connection.

2. An arrangement for damming-up and collecting a quantity of fuel according to claim 1, wherein said two separate housings are disposed eccentrically within each other so that they touch only at said one place and are connected with each other thereat.

3. An arrangement for damming-up and collecting a quantity of fuel according to claim 1, wherein said two separate housings are disposed essentially coaxially with respect to each other, the larger outer housing being provided with a flattened portion, said one place being disposed along said flattened portion.

4. An arrangement for damming-up and collecting a quantity of fuel according to claim 1, wherein said inlet means is formed by a window in the wall of said larger outer housing extending approximately to half the wall height thereof.

5. An arrangement for damming-up and collecting a quantity of fuel according to claim 4, wherein an aperture is provided in the wall of the smaller inner housing leading into the inner space to provide a passage for the inflowing fuel, said aperture being disposed ahead of the connection of said housings at said one place.

6. An arrangement for damming-up and collecting a quantity of fuel according to claim 1, wherein said two housings have a common center axis, and wherein said intake means is disposed essentially in said common axis.

7. A fuel intake arrangement located in the fuel tank for an injection-type internal combustion engine of a vehicle supplied with fuel from said fuel tank through a fuel suply line by means of a fuel injection pump, which arrangement is for damming-up and collecting a quantity of fuel sufficieint for the supply of said engine during the occurrence of accelerating forces acting on the vehicle, comprising intake means for leading to said fuel supply line, said intake means extending into said fuel tank in proximity to the tank bottom thereof, housing means attached to said tank bottom and arranged about said intake means including inner and outer upstanding wall means forming a passage therebetween in the form of an essentially annularly-shaped channel for communication between the interior of said housing means and said fuel tank, said channel discharging near the inner end thereof into the inner space of said housing means, the outer wall means of said housing means being provided with inlet means in communication with the other end of said channel, and return line means for conducting the over-flow portion of fuel from said injection pump into said fuel tank including discharge means discharging said over-flow portion within said housing means.

8. An arrangement for damming-up and collecting a quantity of fuel according to claim 7, wherein said inner and outer wall means are formed by a single spirally shaped housing member, said essentially annular channel being the channel formed by said member in tracing its spiral, and wherein said discharge means extends in the direction of the inner end of said channel.

9. An arrangement for damming-up and collecting a quantity of fuel according to claim 7, wherein said inner and outer wall means are formed by two separate housings one disposed within the other and connected with each other at only one place, and wherein said discharge means is disposed within the region of the connection between said separate housings within the inner housing thereof and extends in the direction parallel to the inflowing fuel coming from said fuel tank.

10. An arrangement for damming-up and collecting a quantity of fuel according to claim 7, wherein said discharge means is disposed essentially tangentially to the inner wall means of said housing means and inclined downwardly.

11. An arrangement for damming-up and collecting a quantity of fuel according to claim 7, further comprising deflection means connected to the inner wall of said housing means and provided with a deflection surface extending in the direction toward said intake means, and wherein said channel is formed by a single spirally-shaped housing member and said deflection means is located at the beginning of said spiral.

12. An arrangement for damming-up and collecting a quantity of fuel according to claim 11, further comprising filter means disposed about said intake means, and wherein said deflection surface is directed tangentially toward said filter means.

13. An arrangement for damming-up and collecting a quantity of fuel according to claim 7, further comprising deflection means connected to the inner wall of said housing means and provided with a deflection surface extending in the direction toward said intake means, said deflection means being disposed forwardly as seen in driving direction and laterally of the longitudinal center plane of said housing means extending through said intake means, and wherein said inlet means is disposed rearwardly essentially on said longitudinal center plane.

14. An arrangement for damming-up and collecting a quantity of fuel according to claim 7, further comprising filter means surrounding said intake means and lip-shaped seal means disposed along the upper part of said filter means and surrounding said intake means in sealing relationship with respect thereto.

15. An arrangement for damming-up and collecting a quantity of fuel according to claim 14, further comprising securing means at the housing bottom for said intake means, said securing means including a bow-shaped bracket member provided with an aperture for the passage therethrough of said intake means.

16. A fuel intake arrangement located in the fuel tank for an internal combustion engine of a vehicle supplied with fuel from said tank through a fuel supply line, which arrangement is for damming-up and collecting a quantity of fuel sufficient for the supply of said engine during the occurrence of accelerating forces acting on the vehicle, comprising intake means for leading to said fuel supply line, said intake means extending into said fuel tank in proximity to the tank bottom thereof, and housing means arranged about said intake means including upstanding wall means attached to said tank bottom, said wall means forming a communicating passage in the form of an essentially annular channel between the interior of said housing and said fuel tank adjacent the tank bottom, said channel terminating near one end thereof in the inside of said housing means within the inner space thereof, and the wall means of said housing means being effectively closed at least laterally with the exception of inlet means in communication with said channel.

17. A fuel intake arrangement as defined in claim 16, further including return line means for conducting the overflow portion of the fuel from said engine to said fuel tank including discharge means discharging said overflow portion within the inner space of said housing means essentially tangentially of said wall means.

18. A fuel intake arrangement located in the fuel tank for an internal combustion engine of a vehicle supplied with fuel from said tank through a fuel supply line, which arrangement is for damming-up and collecting a quantity of fuel sufficient for the supply of said engine during the occurrence of accelerating forces acting on the vehicle, comprising intake means for leading to said fuel supply line, said intake means extending into said fuel tank in proximity to the tank bottom thereof, and housing means attached to said tank bottom and arranged about said intake means, said housing means including upstanding inner and outer wall means forming therebetween a communicating passage in the form of an essentially annularly-shaped channel, said channel terminating near one end thereof on the inside of said housing means within the inner wall means, and the outer wall means of said housing means being effectively closed laterally with the exception of inlet means in communication with said channel.

19. A fuel intake arrangement located in the fuel tank for an internal combustion engine of a vehicle supplied with fuel from said tank through a fuel supply line, which arrangement is for damming-up and collecting a quantity of fuel sufficient for the supply of said engine during the occurrence of accelerating forces acting on the vehicle, comprising intake means for leading to said fuel supply line and extending into said fuel tank in proximity to the tank bottom thereof, and housing means attached to said tank bottom and arranged about said intake means and including upstanding wall means forming an essentially annularly-shaped communicating channel, said wall means being formed by a single spirally-shaped housing member and said communicating passage comprising the essentially annularly-shaped channel formed by said spirally-shaped housing member, said channel terminating near one end thereof on the inside of said housing means within the inner space thereof, and the outer portion of said wall means being effectively closed laterally with the exception of inlet means in communication with said channel.

20. An arrangement for damming-up and collecting a quantity of fuel according to claim 19, wherein the spirally-shaped housing member is formed by a housing wall means which has approximately one and one-half turns, and wherein the outer spiral end is constructed as a funnel-shaped inlet passage.

21. A fuel intake arrangement located in the fuel tank for an internal combustion engine supplied with fuel from said tank through a fuel supply line, which arangement is for damming-up and collecting a quantity of fuel, comprising intake means for leading to said fuel supply line, said intake means extending into said fuel tank in proximity to the tank bottom thereof, and housing means arranged about said intake means including upstanding wall means attached to said tank bottom and essentially surrounding said intake means, said wall means forming a communicating passage in the form of a channel between the interior of said housing and the portion of said fuel tank adjacent the tank bottom, said channel having an angular path extending about the center of said housing and terminating near one end thereof in the inside of said housing means within the inner space thereof, and the wall means of said housing means being effectively closed at least laterally with the exception of inlet means in communication with said channel.

22. A fuel intake arrangement located in the fuel tank for an internal combustion engine of a vehicle supplied with fuel from said tank through a fuel supply line, which arrangement is for damming-up and collecting a quantity of fuel sufficient for the supply of said engine during the occurrence of accelerating forces acting on the vehicle, comprising intake means for leading to said fuel supply line, said intake means extending into said fuel tank in proximity to the tank bottom thereof, and housing means arranged about said intake means including upstanding wall means attached to said tank bottom and essentially surrounding said intake means, said wall means forming a communicating passage in a form of a channel between the interior of said housing and said fuel tank adjacent the tank bottom, said channel having a path extending about the center of said housing and terminating near one end thereof in the inside of said housing means within the inner space thereof, the wall means of said housing means being effectively closed at least laterally with the exception of inlet means in communication with said channel, and return line means for conducting the overflow portion of fuel from said engine to said fuel tank including discharge means discharging said overflow portion within the inner space of said housing means.

References Cited in the file of this patent

UNITED STATES PATENTS

| | | |
|---|---|---|
| 2,547,246 | Aspelin | Apr. 3, 1951 |
| 2,588,778 | Tibeau | Mar. 11, 1952 |
| 2,757,686 | Maxwell | Aug. 7, 1956 |
| 2,767,736 | Lachinger | Oct. 23, 1956 |
| 2,860,648 | Harrison | Nov. 18, 1958 |